United States Patent [19]

Kawaguchi et al.

[11] Patent Number: 5,638,122
[45] Date of Patent: Jun. 10, 1997

[54] VIDEO CAMERA APPARATUS AND AUTOMATIC FOCUSING CIRCUIT

[75] Inventors: Naoki Kawaguchi; Reiko Torii, both of Tokyo, Japan

[73] Assignee: Sony Corporation, Tokyo, Japan

[21] Appl. No.: 651,853

[22] Filed: May 9, 1996

Related U.S. Application Data

[63] Continuation of Ser. No. 544,059, Oct. 17, 1995, abandoned, which is a continuation of Ser. No. 263,428, Jun. 21, 1994, abandoned.

[30] Foreign Application Priority Data

Jun. 24, 1993 [JP] Japan .................................. 5-177481

[51] Int. Cl.$^6$ ............................................. H04N 5/232
[52] U.S. Cl. ........................... 348/349; 348/355; 348/356; 250/201.7
[58] Field of Search .................................. 348/345, 349, 348/354, 355; 250/201.7, 201.8; H04N 5/232

[56] References Cited

U.S. PATENT DOCUMENTS 4,922,346  5/1990  Hidaka et al. ........................ 348/355
5,055,665  10/1991  Baba et al. ........................ 250/201.7

*Primary Examiner*—Wendy Garber
*Assistant Examiner*—Andrew B. Christensen
*Attorney, Agent, or Firm*—William S. Frommer; Alvin Sinderbrand

[57] ABSTRACT

An automatic focusing circuit comprises: a lens section including a focusing lens; photoelectric converting means for photoelectrically converting an amount of light which passed through the lens section; a first filter having first frequency characteristics to extract a first high frequency component from a luminance signal; a second filter which is used to extract a second high frequency component from said luminance signal and which has frequency characteristics steeper than those of the first filter; optical black level detecting means for detecting an optical black level of an image pickup signal; and a control section to control the focusing lens on the basis of the optical black level and the first and second high frequency components.

12 Claims, 7 Drawing Sheets

VIDEO CAMERA APPARATUS AND AUTOMATIC FOCUSING CIRCUIT This application is a continuation of application Ser. No. 08/544,059, filed Oct. 17, 1995, now abandoned which is a continuation of Ser. No. 263,428, filed Jun. 21, 1994, now abandoned.

BACKGROUND OF THE INVENTION

1. Field of the Invention

The present invention relates to an automatic focusing circuit which is suitable when it is used in, for example, a video camera and also relates to a video camera apparatus using the above automatic focusing circuit.

2. Description of the Related Art

A video camera in which an image pickup signal of an object is formed as an image on a CCD image pickup device and is photoelectrically converted and is subjected to a predetermined signal process and the processed signal is recorded onto a tape is generally used. Ordinarily, an automatic focusing mechanism for automatically focusing a focusing lens to an object is provided for the video camera. Please refer to U.S. Pat. No. 5,093,716 filed by the same applicant as the present invention with respect to the related art of the automatic focusing. In order to make the automatic focusing mechanism operative, a video signal is detected by an automatic focusing detecting circuit. In this instance, it is assumed that the maximum portion of high frequency components in the video signal is set to an in-focus position. The detection signal (hereinafter, refereed to as an evaluation value) is supplied to a focusing lens driving motor as a control signal. The focusing lens is moved to the in-focus position by the control signal.

FIG. 1 is a graph showing the relation between the position of the focusing lens (an axis of abscissa) and the evaluation value (an axis of ordinate). In FIG. 1, when the evaluation value is maximum, the position of the focusing lens is moved to the in-focus position. On the other hand, in the case where the evaluation value is low, it is judged that the present position of the focusing lens is located at an out-of-focus (blur) position, so that the focusing lens position is gradually moved to the in-focus position.

FIG. 2 is a diagram with respect to a mountain climbing control to move the focusing lens to the in-focus position. An axis of abscissa indicates the position of the focusing lens. An axis of ordinate indicates the evaluation value. For instance, when a power source of the video camera is turned on, it is detected that the focusing lens is located to the position of an evaluation value S. Information indicative of such a state is supplied to a controller. When the focusing lens is moved from the evaluation value S to, for example, an evaluation value T, the evaluation value T of the focusing lens at that time point is detected and the information is supplied to the controller. The controller compares the evaluation values S and T. In the case where the evaluation value T is larger than the evaluation value S, the focusing lens is further moved in the direction of the in-focus position. The next comparison is executed by setting the evaluation value T as a reference. Namely, the comparison between a new evaluation value U of the focusing lens which was moved to the in-focus position direction and the evaluation value T is executed. As will be also understood from FIG. 2, the evaluation value T has a value larger than the evaluation value U. Due to this, it is judged that the evaluation value is equal to the peak value. That is, the focusing lens is located at the in-focus position and the mountain climbing control is finished.

On the other hand, as operations of the automatic focusing, there are activating, in-focusing, and stand-by operations. They are classified into modes and a mode transition is performed. As kinds of modes, for example, there are an activating mode, a mountain climbing mode, a returning mode for returning to the in-focus point, a peak confirming mode, a small frame confirming mode, a wobbling mode, a stopping mode, a special processing mode, and the like.

As shown in FIGS. 3A and 3B, the evaluation value is large at the time of in-focus and is small at the time of out-of-focus. Since the evaluation value is relative, however, it is impossible to judge whether the focusing lens is located at the in-focus position or at the out-of-focus position from the absolute value of the evaluation value. Namely, an evaluation value α in the case where the focusing lens is located at the in-focus position in FIG. 3B is set to the same level as that of an evaluation value in a blur region of the focusing lens in FIG. 3A. When referring to FIG. 3, for example, in the case where a scene of whole black is being photographed, an output (evaluation value of noises) at a certain level is obtained in spite of the fact that the focusing lens is located at the in-focus position. As a result, there is a case where an erroneous operation occurs in dependence on the evaluation value of noises. On the other hand, when the focusing lens is located at the position of a large blur for a focussing position, since the focusing lens is gradually moved to the in-focus position direction, it takes a long time to obtain the in-focus state.

OBJECTS AND SUMMARY OF THE INVENTION

It is, therefore, an object of the invention to provide an automatic focusing circuit which can eliminate an evaluation value of noises and can prevent an erroneous operation by the evaluation value of noises and, when the focusing lens is located at a position of a large blur for the focusing position, which can move the focusing lens to the direction of the in-focus position at a high speed and also to provide a video camera apparatus in which such an automatic focusing circuit is installed.

According to the present invention, there is provided an automatic focusing circuit in a video camera having a lens section having a focusing lens and photoelectric converting means for photoelectrically converting an amount of light which passed through the lens section, wherein the automatic focusing circuit comprises: a first filter which has first frequency characteristics and is used to extract a first high frequency component from a luminance signal; a second filter which has steeper frequency characteristics than those of the first filter and is used to extract a second high frequency component from the luminance signal; optical black level detecting means for detecting an optical black level of an image pickup signal; and a control section to control the focusing lens on the basis of the optical black level and the first and second high frequency components.

According to the invention, there is provided a video camera having a focusing function, comprising: a lens section having a focusing lens; photoelectric converting means for photoelectrically converting an image pickup signal which passed through the lens section; optical black level detecting means having a first filter to which an output of the photoelectric converting means is supplied and which has first frequency characteristics to extract a first high frequency component from a luminance signal, a second filter which has steeper frequency characteristics than those of the first filter and is used to extract a second high frequency component from the above luminance signal, and detecting means for detecting an optical black level of the image pickup signal; and control means for generating a control signal on the basis of an output of the optical black detecting means and lens position information of the lens section, for supplying the control signal to the lens section, and for controlling the position of the focusing lens.

According to the invention, there is provided an automatic focusing method in a video camera having a lens section having a focusing lens and photoelectric converting means for photoelectrically converting an amount of light which passed through the lens section, wherein the control method comprises the steps of: extracting a first high frequency component from a luminance signal by a first filter having first frequency characteristics; extracting a second high frequency component from the luminance signal by a second filter having frequency characteristics which are steeper than those of the first filter; detecting an optical black level of an image pickup signal; and controlling the focusing lens on the basis of the optical black level and the first and second high frequency components.

The above and other objects and features of the present invention will become apparent from the following detailed description and the appended claims with reference to the accompanying drawings.

DETAILED DESCRIPTION OF THE PREFERRED EMBODIMENT

Figure 1:
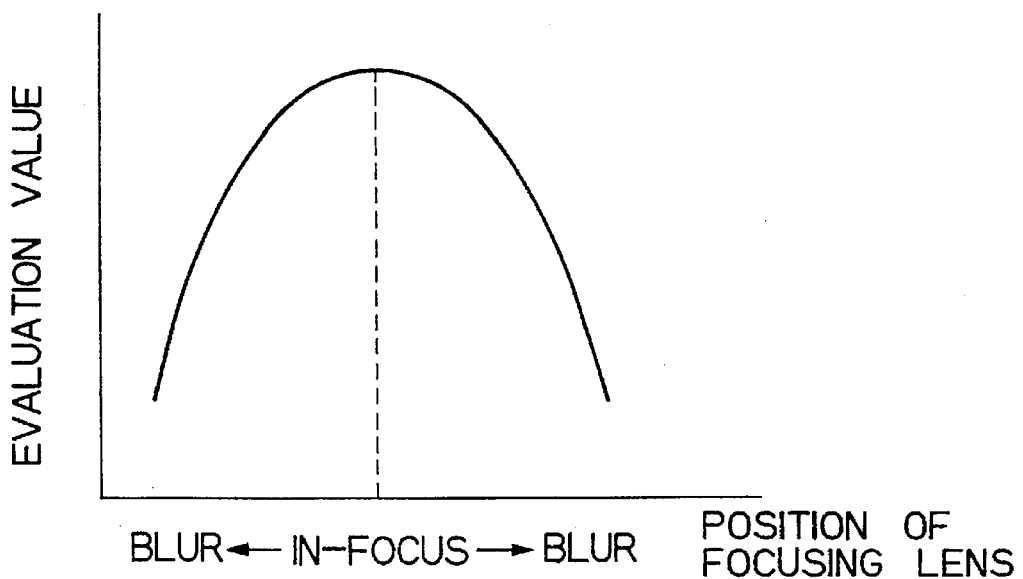
FIG. 1 is a graph showing the relation between the position of a focusing lens and the evaluation value.
Figure 2:
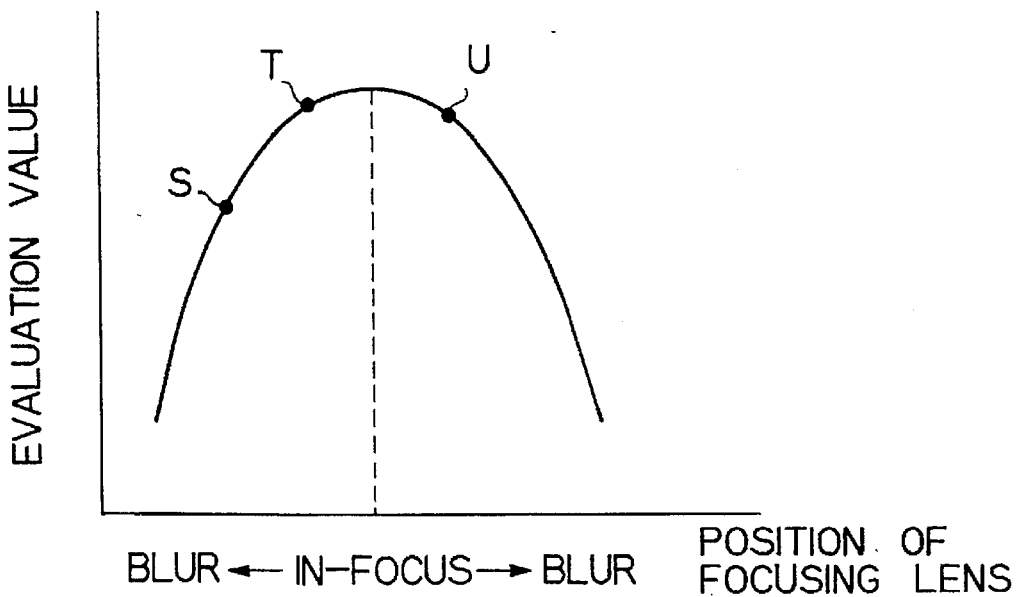
FIG. 2 is a diagram regarding a mountain climbing control for moving the focusing lens to an in-focus position.
Figure 3:
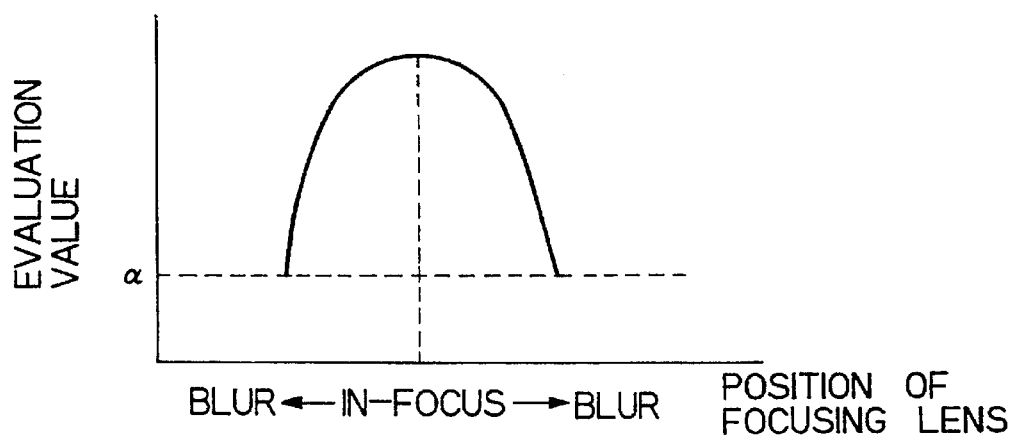
FIGS. 3A and 3B are graphs showing the relations between the position of the focusing lens and the evaluation value.
Figure 3:
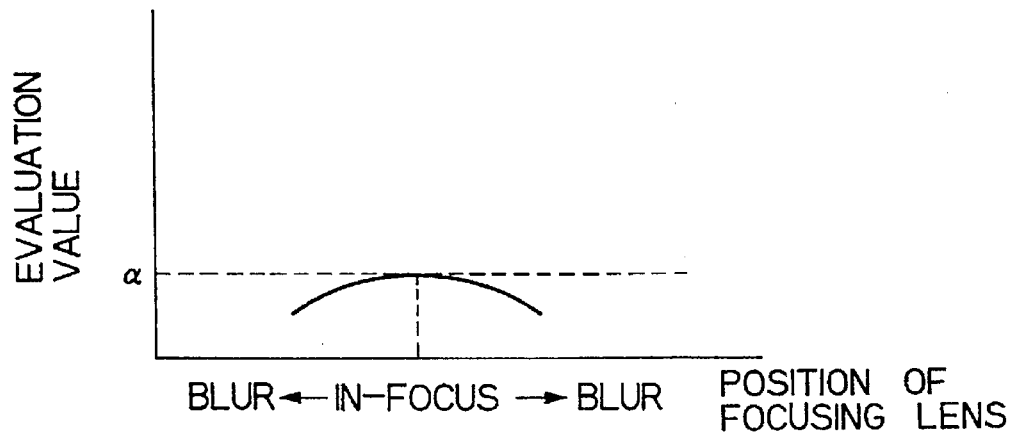
Figure 4:
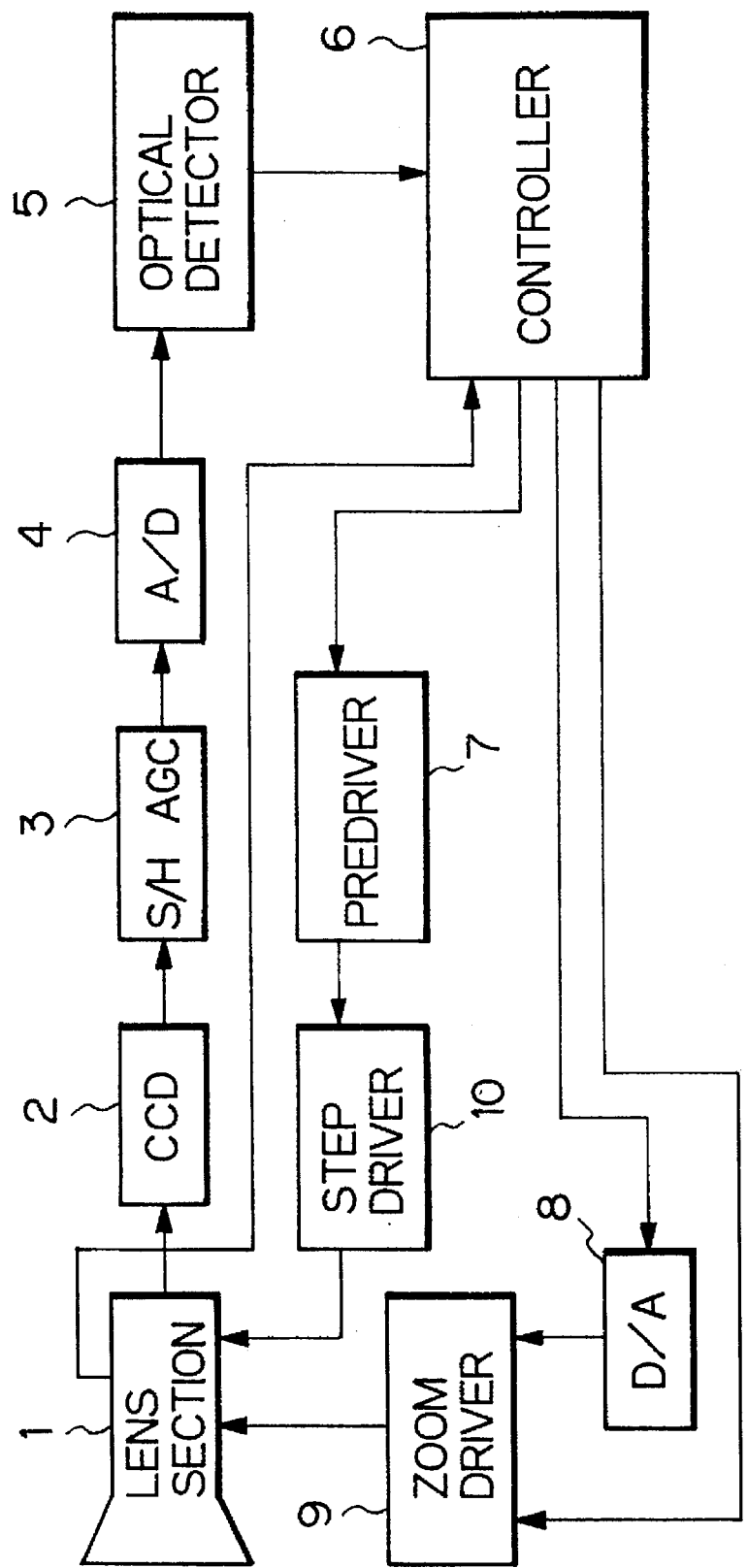
FIG. 4 is a block diagram of a video camera using an automatic focusing circuit according to the present invention.

FIG. 4 is a block diagram of a video camera using an automatic focusing circuit according to the invention. In FIG. 4, an amount of light which entered through a lens section 1 constructed by an inner focusing lens as shown in, for example, U.S. Pat. No. 5,212,593 filed by the same applicant as the present invention is formed as an image on a CCD image pickup device 2 and is photoelectrically converted. An image pickup signal which is generated from the CCD image pickup device 2 is supplied to a sample and hold circuit and an AGC amplifier 3 (also simply referred to as an S/H AGC 3). An output signal of the S/H AGC 3 is supplied to an A/D converter 4, by which it is converted into digital data of, for example, 10 bits. The digital data is supplied to an optical black detector 5.

The optical black detector 5 detects evaluation values of the automatic focusing, automatic white balance, automatic exposure, and the like. Those evaluation values are supplied to a controller 6. Opening/closing information of an iris, position information of a zoom lens, and position information of the focusing lens are supplied from the lens section 1 to the controller 6. Signals based on the change amounts of the evaluation values and those information are supplied to a predriver 7, a D/A converter 8, and a zoom motor driver 9. An output signal of the predriver 7 is supplied to a step motor (not shown) to move the focusing lens through a step motor driver 10.

An analog output signal of the D/A converter 8 is supplied to the zoom motor driver 9. The zoom motor driver 9 generates a signal to move the zoom lens on the basis of the two signals supplied. Such a movement signal is supplied to a DC zoom motor (not shown) to move the zoom lens. In this manner, the focusing lens and the zoom lens arranged in the lens section 1 are moved to the optimum positions.

Figure 5:
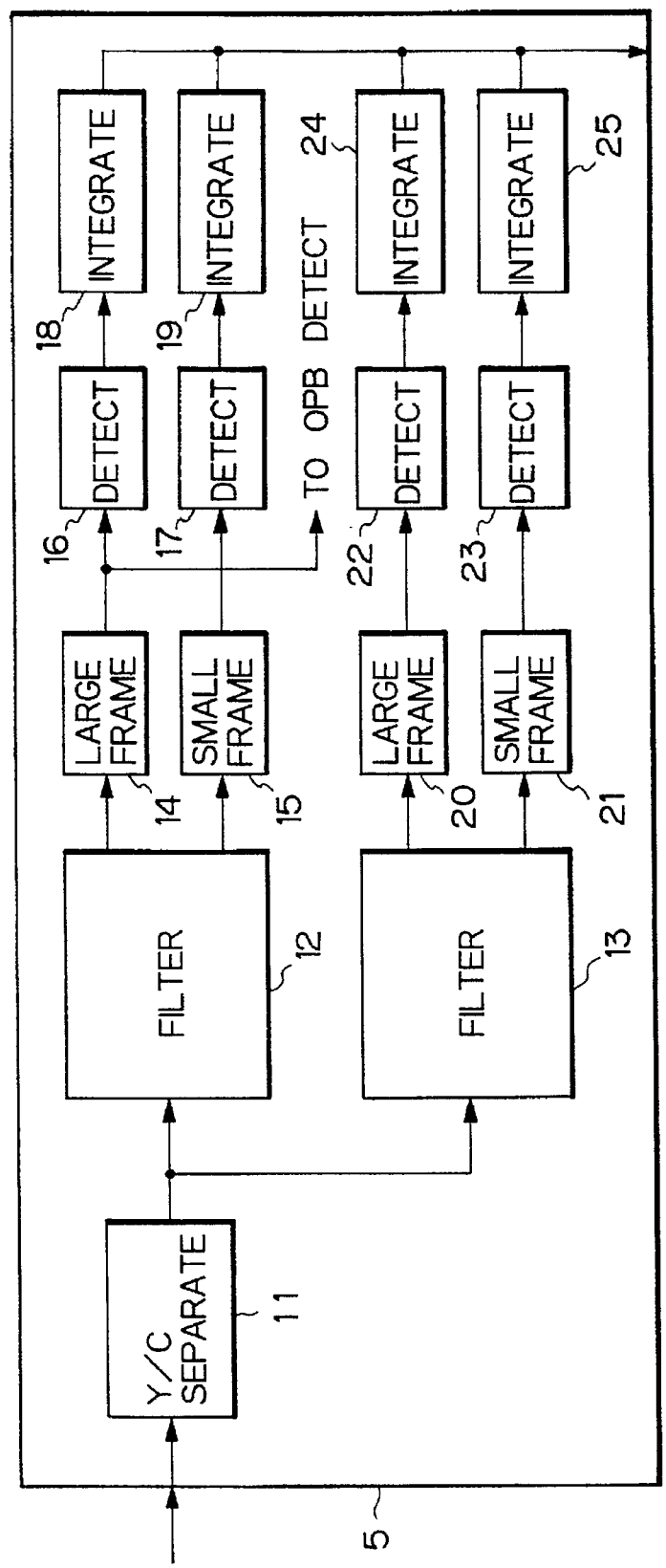
FIG. 5 is a detailed block diagram of an optical black detector.

FIG. 5 is a detailed block diagram of the optical black detector 5. In FIG. 5, the A/D converted image pickup signal of, for instance, 10 bits is supplied to a Y/C separating circuit 11. Only a luminance signal Y is supplied to two filters of different frequency characteristics, namely, a first filter 12 and a second filter 13. The first filter 12 is a filter of a low cut-off frequency and generates a luminance signal in a range, for example, from 150 Khz to 3 Mhz. On the other hand, the second filter 13 is a filter of a high cut-off frequency and generates a luminance signal in a range, for example, from 2 MHz to 3 MHz.

An output signal of the first filter 12 is supplied to a large frame setting circuit 14 and a small frame setting circuit 15. The large frame setting circuit 14 and small frame setting circuit 15 are used for automatic focusing. Output signals of the setting circuits 14 and 15 are supplied to detecting circuits 16 and 17, respectively, and are also supplied to an optical black detecting circuit (not shown), by which they are integrated and supplied to the controller 6. The signals detected by the detecting circuits 16 and 17 are respectively supplied to integrating circuits 18 and 19 and are integrated, so that an evaluation value is derived. After that, the evaluation value is supplied to the controller 6 in a serial communication format. As mentioned above, the evaluation value of the luminance signal and the evaluation value of the optical black are supplied to the controller 6 on the basis of the output signal of the first filter 12.

On the other hand, an output signal of the second filter 13 is supplied to a large frame setting circuit 20 and a small frame setting circuit 21. The large and small frame setting circuits 20 and 21 are also used for automatic focusing in a manner similar to the large and small frame setting circuits 14 and 15 mentioned above. Output signals of the setting circuits 20 and 21 are supplied to detecting circuits 22 and 23, respectively. The signals detected by the detecting circuits 22 and 23 are respectively supplied to integrating circuits 24 and 25 and integrated and the resultant value is set into an evaluation value. After that, the evaluation value is supplied to the controller 6 in the serial communication format.

Figure 6:
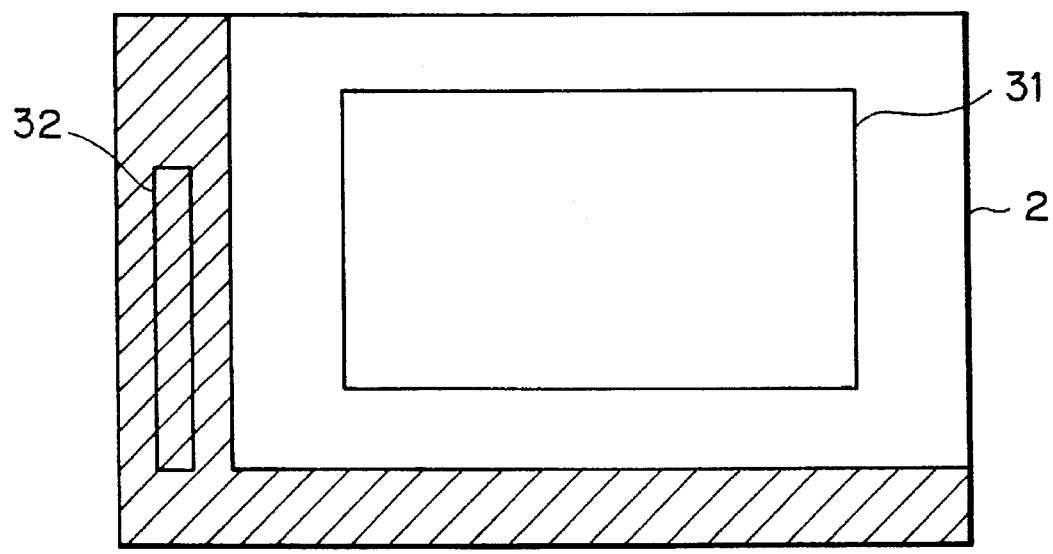
FIG. 6 is a diagram showing a construction of a CCD image pickup device.

FIG. 6 is a constructional diagram of the CCD image pickup device 2. In order to clamp the black level of a video image every field, a portion (optical black) in which a photodiode is shielded from the light is provided for the CCD image pickup device. In FIG. 6, reference numeral 31 denotes a video interval frame (large frame and small frame) in the CCD image pickup device 2. Reference numeral 32 denotes an optical black portion. By scanning the video interval frame 31 and optical black portion 32, a signal which is obtained from the optical black portion 32 is used as a reference black level.

According to the invention, the signal of the optical black portion 32 is also used as an evaluation value (absolute value) for automatic focusing. Due to this, the moving direction and moving speed of the focusing lens are set on the basis of the evaluation value of the video signal and the evaluation value which is output from the optical black portion 32.

Figure 7A:
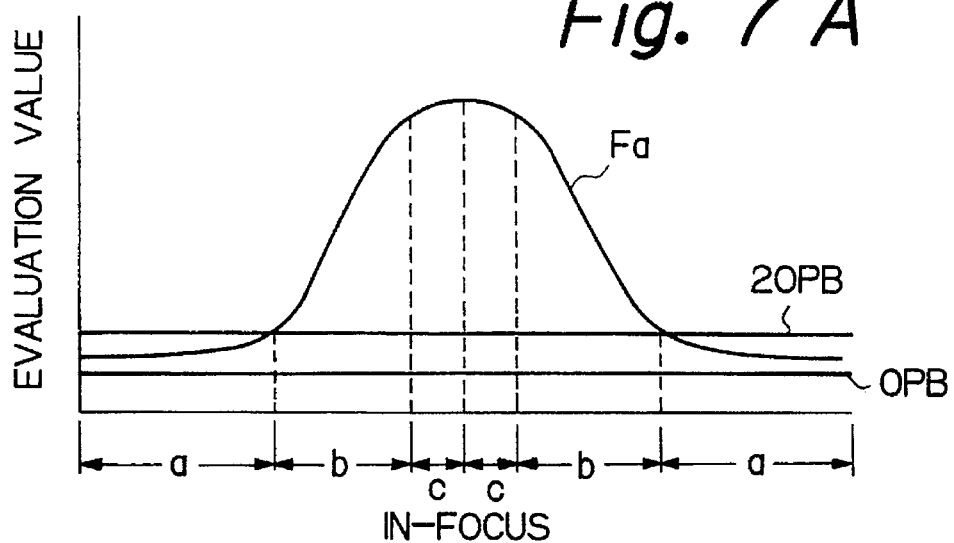
FIGS. 7A to 7C are diagrams showing evaluation values of a video signal and evaluation values of optical black.
Figure 7B:
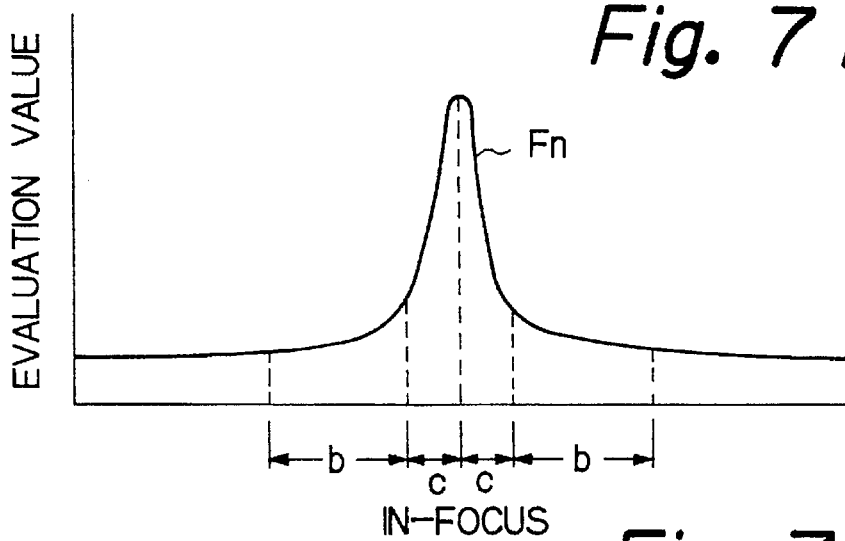
Figure 7C:
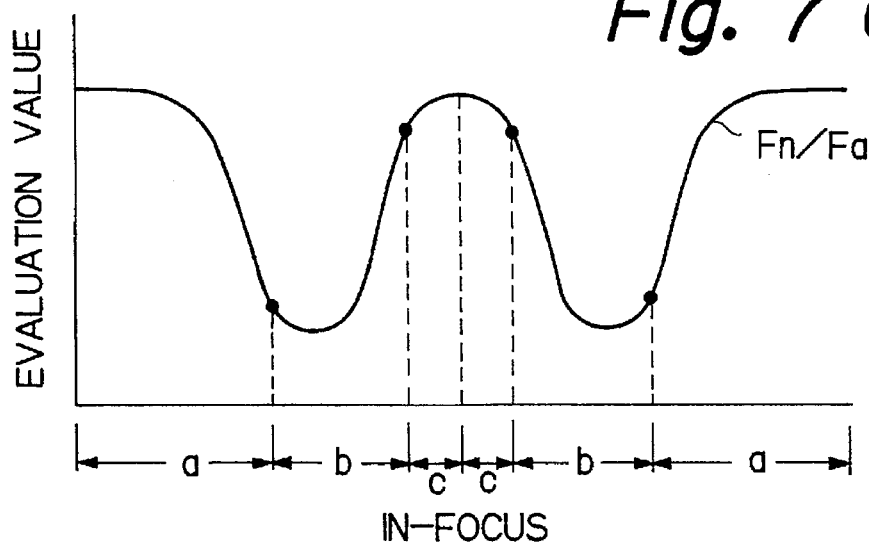

FIG. 7 is a diagram showing the evaluation value of the luminance signal and the evaluation value of the optical black. In FIG. 7A, a waveform shown by Fa denotes an evaluation value of the video signal obtained through the first filter 12. A waveform shown by OPB denotes an evaluation value (absolute value) of the optical black. A waveform shown by 2OPB is obtained by, for example, increasing the evaluation value of the optical black by two times and is used as a threshold level. The threshold level can be also changed to the value which is 1.5 times, 3 times, or the like as large as the evaluation value of the optical black. In FIG. 7B, a waveform of the evaluation value of the video signal obtained through the second filter 13 is shown by Fn. In FIG. 7C, a ratio between the waveforms Fa and Fn is shown.

In FIG. 7A, in a large blur region [hereinafter, referred to as a region (a)] in which the value of Fa is smaller than the value of 2OPB, it is judged that the present position of the focusing lens is largely blurred (namely, deviated) for an object. The region in this instance corresponds to the region (a) in FIG. 7C and the focusing lens is unconditionally moved in the direction of the in-focus position at a high speed. When the value of Fa is equal to or larger than the value of 2OPB, it is judged that the present position of the focusing lens lies within a middle blur region [hereinafter, referred to as a region (b)] or a small blur region [hereinafter, referred to as a region (c)] or exists at the in-focus position, so that the ordinary focusing lens driving operation is performed.

For example, when the focusing lens is moved at a high speed from the region (a) to the region (b) for the object, the focusing lens is moved from the region (b) in the direction of the in-focus position, namely, into the region (c) in accordance with a curve along the waveform Fa. When the focusing lens is moved into the region (c), the focusing lens is moved to the in-focus position by the operation according to the curve of the waveform Fn. As mentioned above, since the waveform Fn is used in the movement from the region (a) to the in-focus position, the focusing lens can be immediately moved to the in-focus position.

Figure 8:
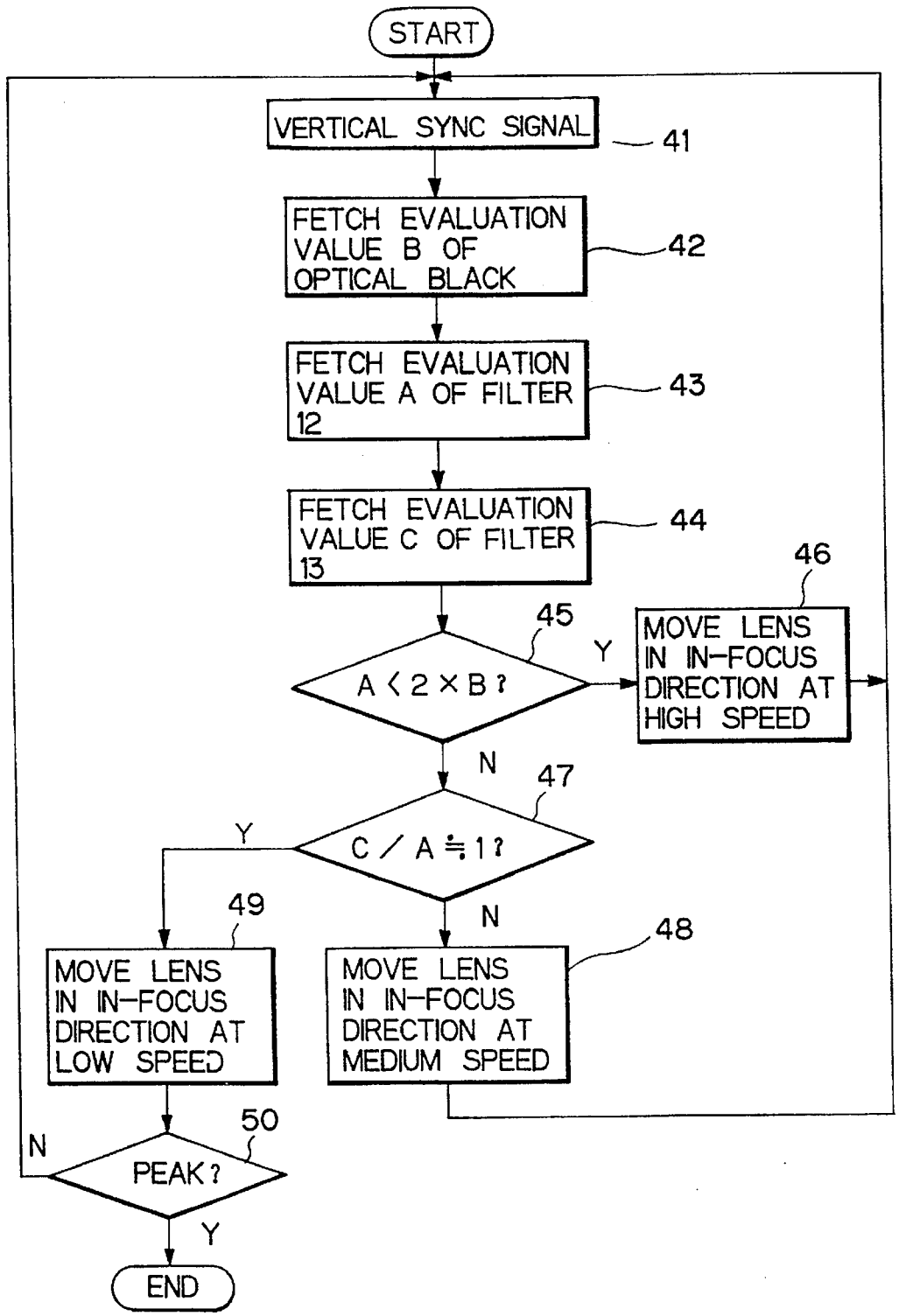
FIG. 8 is a flowchart regarding the movement of the focusing lens.

FIG. 8 shows a flowchart regarding the movement of the focusing lens. In FIG. 8, when a vertical sync signal in the video signal is input (step 41), the evaluation value (assumes B) of the optical black is detected (step 42). In step 43, the evaluation value (assumes A) of the filter 12 is detected. In step 44, the evaluation value (assumes C) of the filter 13 is detected. A check is made to see if the evaluation value A is smaller than the value which is two times as large as the evaluation value B or not (step 45). When the evaluation value A is smaller than the value which is two times as large as the evaluation value B, this means that the focusing lens lies within the region (a) (large blur region). Therefore, the focusing lens is moved at a high speed in the direction of the in-focus position (step 46). After that, the processing routine is returned to step 41.

On the other hand, when it is judged in step 45 that the evaluation value A is larger than or equal to the value which is two times as large as the evaluation value B, a check is made in step 47 to see if the ratio (C/A) between the evaluation values C and A is close to, for example, "1" or not. When the ratio which is judged in step 47 is not close to "1", this means that the focusing lens lies within the region (b) (middle blur region). Therefore, the focusing lens is moved at a middle speed in the direction of the in-focus position in accordance with the characteristics of the filter 12 (step 48). After that, the processing routine is returned to step 41.

When it is judged in step 47 that the ratio between the evaluation values C and A is close to "1", this means that the focusing lens lies within the region (c) (small blur region). Therefore, the focusing lens is moved at a low speed in the direction of the in-focus position in accordance with the characteristics of the filter 13 (step 49). In step 50, a mountain climbing detection is performed and a check is made to see if the evaluation value has reached the peak value or not. When the evaluation value doesn't reach the peak value yet, the processing routine is returned to step 41. On the other hand, when the evaluation value is equal to the peak value, it is judged that the focusing lens has reached the in-focus position, so that the automatic focusing process is finished.

As mentioned above, the optical black which is used in the clamping circuit is detected as an evaluation value (absolute value) and the evaluation value is used as an absolute value for controlling the movement of the focusing lens. Due to this, it is possible to accurately judge whether the focusing lens is located at the in-focus position or at the out-of-position. Therefore, an erroneous operation due to the evaluation value of noises as in the conventional apparatus can be prevented. When the focusing lens is located at the large blur position for the focusing position, on the other hand, the focusing lens can be moved at a high speed in the in-focus position direction, so that the focusing position can be set to the in-focus position in a short time.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An automatic focusing circuit including a lens section having a movable focusing lens driven at a controllable speed and photoelectric converting means for photoelectrically converting an amount of light passing through said lens section into an image pickup signal, comprising:

first filter means having first frequency characteristics for extracting a first high frequency component from a luminance signal included in said image pickup signal;

second filter means having second frequency characteristics steeper than said first frequency characteristics for extracting a second high frequency component from said luminance signal;

optical black level detecting means for detecting an optical black level of said image pickup signal; and control means for controlling the speed of moving said focusing lens on the basis of said optical black level and said first and second high frequency component such that said focusing lens is moved at a high speed when said first high frequency component is less than a predetermined threshold which is a function of said optical black level, said focusing lens is moved at a low speed when (i) said first high frequency component is larger than said predetermined threshold and (ii) a ratio of said second high frequency component to said first high frequency component is substantially equal to a predetermined value, and said focusing lens is moved at an intermediate speed when (i) said first high frequency component is larger than said predetermined threshold and (ii) said ratio of said second high frequency component to said first high frequency component is not substantially equal to said predetermined value.

2. A circuit according to claim 1, wherein said predetermined threshold has a value which is twice said optical black level.

3. A circuit according to claim 1, where said predetermined value is equal to 1.

4. A video camera having a focusing function, comprising:

a lens section having a movable focusing lens driven at a controllable speed;

photoelectric converting means for photoelectrically converting an amount of light passing through said lens section into an image pickup signal;

first filter means having first frequency characteristics for extracting a first high frequency component from a luminance signal included in said image pickup signal;

second filter means having second frequency characteristics steeper than said first frequency characteristics for extracting a second high frequency component from said luminance signal;

optical black level detecting means for detecting an optical black level of an image pickup signal; and control means for controlling the speed of moving said focusing lens on the basis of said optical black level and said first and second high frequency component such that said focusing lens is moved at a high speed when said first high frequency component is less than a predetermined threshold which is a function of said optical black level, said focusing lens is moved at a low speed when (i) said first high frequency component is larger than said predetermined threshold and (ii) a ratio of said second high frequency component to said first high frequency component is substantially equal to a predetermined value, and said focusing lens is moved at an intermediate speed when (i) said first high frequency component is larger than said predetermined threshold and (ii) said ratio of said second high frequency component to said first high frequency component is not substantially equal to said predetermined value.

5. A video camera according to claim 4, wherein said predetermined threshold has a value which is twice said optical black level.

6. A video camera according to claim 4, wherein said predetermined value is equal to 1.

7. An automatic focus control method for use with a lens section having a movable focusing lens driven at a controllable speed and photoelectric converting means for photoelectrically converting an amount of light passing through said lens section into an image pickup signal, comprising the steps of:

extracting a first high frequency component from a luminance signal included in said image pickup signal using first filter means having first frequency characteristics;

extracting a second high frequency component from said luminance signal having second frequency characteristics steeper than said first frequency characteristics;

detecting an optical black level of said image pickup signal; and controlling the speed of moving said focusing lens on the basis of said optical black level and said first and second high frequency components such that said focusing lens is moved at a high speed when said first high frequency component is less than a predetermined threshold which is a function of said optical black level, said focusing lens is moved at a low speed when (i) said first high frequency component is larger than said predetermined threshold and (ii) a ratio of said second high frequency component to said first high frequency component is substantially equal to a predetermined value, and said focusing lens is moved at an intermediate speed when (i) said first high frequency component is larger than said predetermined threshold and (ii) said ratio of said second high frequency component to said first high frequency component is not substantially equal to said predetermined value.

8. A method according to claim 7, wherein said predetermined threshold has a value which is twice said optical black level.

9. A method according to claim 7, wherein said predetermined value is equal to 1.

10. An automatic focusing circuit including a lens section having a movable focusing lens driven at a controllable speed and photoelectric converting means for photoelectrically converting an amount of light passing through said lens section into an image pickup signal, comprising:

filter means having frequency characteristics for extracting a high frequency component from a luminance signal included in said image pickup signal;

optical black level detecting means for detecting an optical black level of said image pickup signal; and control means for controlling the speed of moving said focusing lens on the basis of a comparison of said optical black level and said high frequency component.

11. A video camera having a focusing function, comprising:

a lens section having a movable focusing lens driven at a controllable speed;

photoelectric converting means for photoelectrically converting an amount of light passing through said lens section into an image pickup signal;

filter means having frequency characteristics for extracting a high frequency component from a luminance signal included in said image pickup signal;

optical black level detecting means for detecting an optical black level of an image pickup signal; and control means for controlling the speed of moving said focusing lens on the basis of a comparison of said optical black level and said high frequency component.

12. An automatic focus control method for use with a lens section having a movable focusing lens driven at a controllable speed and photoelectric converting means for photoelectrically converting an amount of light passing through said lens section into an image pickup signal, comprising the steps of:

extracting a high frequency component from a luminance signal included in said image pickup signal using filter means having frequency characteristics;

detecting an optical black level of said image pickup signal; and controlling the speed of moving said focusing lens on the basis of a comparison of said optical black level and said high frequency component.

* * * * *